(12) United States Patent
Banik et al.

(10) Patent No.: US 8,356,774 B1
(45) Date of Patent: Jan. 22, 2013

(54) STRUCTURE FOR STORING AND UNFURLING A FLEXIBLE MATERIAL

(75) Inventors: Jeremy A. Banik, Albuquerque, NM (US); Thomas W. Murphey, Albuquerque, NM (US)

(73) Assignee: The United States of America as Represented by the Secretary of the Air Force, Washington, DC (US)

( * ) Notice: Subject to any disclaimer, the term of this patent is extended or adjusted under 35 U.S.C. 154(b) by 1468 days.

(21) Appl. No.: 12/106,716

(22) Filed: Apr. 21, 2008

(51) Int. Cl.
*B64G 1/40* (2006.01)
(52) U.S. Cl. .............. 244/159.5; 244/171.1; 244/172.2; 244/62
(58) Field of Classification Search ............. 114/102.12, 114/102.15, 104; 135/20.3, 31, 15.1, 33.2; 242/564.4, 564.3, 388, 397.2, 397.5; 343/705, 343/915, 882; 244/62, 158.1–173.3
See application file for complete search history.

(56) References Cited

U.S. PATENT DOCUMENTS

| | | | | |
|---|---|---|---|---|
| 1,833,004 | A | * | 11/1931 | Spiro ........................... 135/15.1 |
| 1,943,748 | A | * | 1/1934 | Talbot ......................... 242/564.4 |
| 2,942,794 | A | | 6/1960 | Huso |
| 3,217,328 | A | | 11/1965 | Miller |
| 3,576,566 | A | | 4/1971 | Cover, Jr. et al. |
| 3,848,821 | A | * | 11/1974 | Scheel .......................... 242/918 |
| 4,030,102 | A | | 6/1977 | Kaplan et al. |
| 4,614,319 | A | | 9/1986 | Drexler |
| 4,683,475 | A | * | 7/1987 | Luly ............................. 343/915 |
| 5,296,044 | A | | 3/1994 | Harvey et al. |
| 5,446,474 | A | | 8/1995 | Wade et al. |
| 6,689,952 | B2 | | 2/2004 | Kawaguchi |

OTHER PUBLICATIONS

Banik, J., & Murphey, T., "Synchronous Deployed Solar Sail Subsystem Design Concept," *Proceedings of the 48th AIAA Structures, Structural Dynamics, and Materials Conference*, AIAA-2007-1837, Honolulu, Hawaii, 13 pages (Apr. 23-26, 2007).
Banik, J., Murphey, T., & Dumm, H., "Synchronus Deployed Solar Sail Concept Demonstration," *Proceedings of the 49th AIAA Structures, Structural Dynamics, and Materials Conference*, AIAA-2008-2213, Schaumburg, Illinois, 9 pages (Apr. 10, 2008).
Shultz, M., & Pellegrino, S., "Equilibrium paths of mechanical systems with unilateral constraints II. Deployable reflector," *Proc. R. Soc. Lond*. A, vol. 456, pp. 2243-2262 (2000).
Salama, M., White, C., & Leland, R., "Ground Demonstration of a Spinning Solar Sail Deployment Concept," *Journal of Spacecraft and Rockets* vol. 40, No. 1, pp. 9-14 (Jan.-Feb. 2003).
Leipold, M., et al., "Odissee—A proposal for Demonstration of a Solar Sail in Earth Orbit," *Proceedings of the European Conference on Spacecraft Structures, Materials and Mechanical Testing*, Braunschweig, Germany, pp. 245-255 (Nov. 4-6, 1998).

* cited by examiner

*Primary Examiner* — William Gilbert
*Assistant Examiner* — Matthew J Smith
(74) *Attorney, Agent, or Firm* — James M Skorich

(57) ABSTRACT

Flexible and resilient masts are connected by flexible and resilient inner and outer spars, and flexible cords radially connect the spars. A flexible material is attached to the cords. The assembly is wrapped around a rotatable cylindrical drum in the structure's stored configuration. Each mast is flexible only about an axis lying parallel to the axis of rotation of the drum, and is otherwise rigid. Each mast is linear when extended and has a bending stress when deformed into a non-linear configuration, such as when wrapped around the drum. When the structure is in its stored configuration, a restraining device opposes the bending stress and another prevents the drum from rotating. Upon disengagement of the restraining devices, the stored bending strain energy forces the drum to rotate and the masts to extend into the deployed configuration and thereby unfurl the flexible material.

19 Claims, 8 Drawing Sheets

STRUCTURE FOR STORING AND UNFURLING A FLEXIBLE MATERIAL

STATEMENT OF GOVERNMENT INTEREST

The conditions under which this invention was made are such as to entitle the Government of the United. States under paragraph 1(a) of Executive Order 10096, as represented by the Secretary of the Air Force, to the entire right, title and interest therein, including foreign rights.

FIELD OF THE INVENTION

This invention relates to the field of deployable structures. More particularly, flexible and resilient masts are wrapped around a rotatable cylindrical drum for storage and are allowed to linearly extend tangentially to the drum by disengaging restraints and transmitting the bending stress of the wrapped masts to the drum. The bending stress forces the rotation of the drum and, attendant to the deployment of the masts, unfurls flexible material attached to radially disposed cords that are fastened to spars that, in turn, connect the masts.

BACKGROUND OF THE INVENTION

Modern spacecraft include subsystems that take up minimal space when stored and then can be easily deployed into an operational configuration when the spacecraft achieves orbit or otherwise escapes the earth's atmosphere. Examples of such a subsystem include an antenna, solar power array, radiator, communications reflector, radar aperture, sun shade and solar sail. In addition to the aforementioned prerequisites of easy deployment and small size when in its stored or collapsed configuration, such a subsystem must have an efficient mass and deploy into the desired shape with high reliability.

A wide variety of large deployable structures have been used on spacecraft in conjunction with the aforementioned subsystems. In the late 1970's and 1980's, the wrap-rib antenna disclosed by Wada, B. K., Freeland, R. E., and Woods, A. A., "Development of the Structural Technology of a Large Deployable Antenna," *Proceedings of the 13th International Symposium of Space Technology and Science*, Tokyo, Japan, pp. 395-400 (Jun. 28-Jul. 3, 1982), utilized deployable ribs to support a large mesh antenna. Other lightweight deployable structures suited for spacecraft include the flexible solar array disclosed by Olsen, M, "Flexible Solar-Array Mechanism," *Proceedings of the 7th Aerospace Mechanisms Symposium*, NASA TMX-58103, pp. 233-249 (September 1972), and flown in 1971; and the L'Garde inflatable decoys from the 1970's and 1980's and the L'Garde inflatable antenna experiment in the 1990's, disclosed by Cheielewski, A., "Overview of Gossamer Structures," *Gossamer Spacecraft: Membrane Inflatable Structures Technology for Space Applications*, Edited by C. H. M. Jenkins, Vol. 191, Progress in Astronautics and Aeronautics, AIAA, Virginia, pp. 1-33 (2001). Some of the most reliable have been tubular booms and coilable masts, such as those shown by Pelligrino, S., "Large Retractable Appendages in Spacecraft," *Journal of Spacecraft and Rockets*, Vol. 32, No. 6 (November-December 1995).

Due to their relatively large dimensions and structural requirements, solar sails comprise an exclusive class of deployable space structures. Typical solar sail structures rely on tension-only members in order to minimize their mass, for example, suspending a highly flexible membrane film between cables as disclosed by Murphy, D., "Validation of a Scalable Solar Sailcraft System," *Journal of Spacecraft and Rockets*, Vol. 44, No. 4 (July-August 2007); Leipold, M., et al., "ODISSEE—A Proposal for Demonstration of a Solar Sail in Earth Orbit," *Proceedings of the European Conference on Spacecraft Structures, Materials and Mechanical Testing*, Braunschweig, Germany, 245-254 (Nov. 4-6, 1998); and Lichodziejewski D., et al., "Bringing an Effective Solar Sail Design Toward TRL 6," *Proceedings of the 39th AIAA Jet Propulsion Conference and Exhibit*, MAA 2003-4659, Huntsville, Ala. (Jul. 20-23, 2003). Each of the aforementioned designs has successfully deployed a membrane film into the desired final configuration.

The advantage of the present invention is its enhanced reliability to achieve the final, deployed configuration. This reliability is attributed to the absence of kinematic joints and the continual application of tensile forces throughout the structure during deployment.

SUMMARY OF THE INVENTION

Briefly, the present invention is a structure for storing and deploying a flexible material, such as a membrane comprising a solar sail. A plurality of flexible and resilient masts are wrapped around a rotatable cylindrical drum. Each mast is flexible only about an axis lying parallel to the axis of rotation of the drum, and is otherwise rigid. Each of the masts is linear when extended and has a bending stress when deformed into a non-linear configuration, such as when wrapped around the drum. When the invented structure is in its collapsed or stored configuration, rollers and arms apply a frictional force to the masts equal to and opposing the bending stress, and a restraining device prevents the drum from rotating.

When the restraining device is disengaged and the opposing force decreased, the bending stress forces the drum to rotate and the masts to extend into the deployed configuration. The rollers also constrain each mast to extend linearly on a tangent to the cylindrical drum surface at an equally spaced interval from one another, until the each mast is fully extended and the masts collectively form their deployed configuration. In both their collapsed and deployed configurations, the masts lie in a plane normal to the drum's axis of rotation. An outer spar connects the tips of the masts, while an inner spar connects the masts at mast locations lying closer to the drum. Both spars are flexible, resilient and in tension during the interim stages of deployment as well as when the masts are fully deployed.

Flexible cords extend radially to connect the proximal and distal spars when the masts are deployed. The cords are in tension. A flexible material, such as a membrane, is attached to the cords.

Other aspects and advantages of the present invention will become apparent from the following detailed description, taken in conjunction with the following drawings, and illustrating by way of example the principles of the invention.

DETAILED DESCRIPTION

Figure 1:
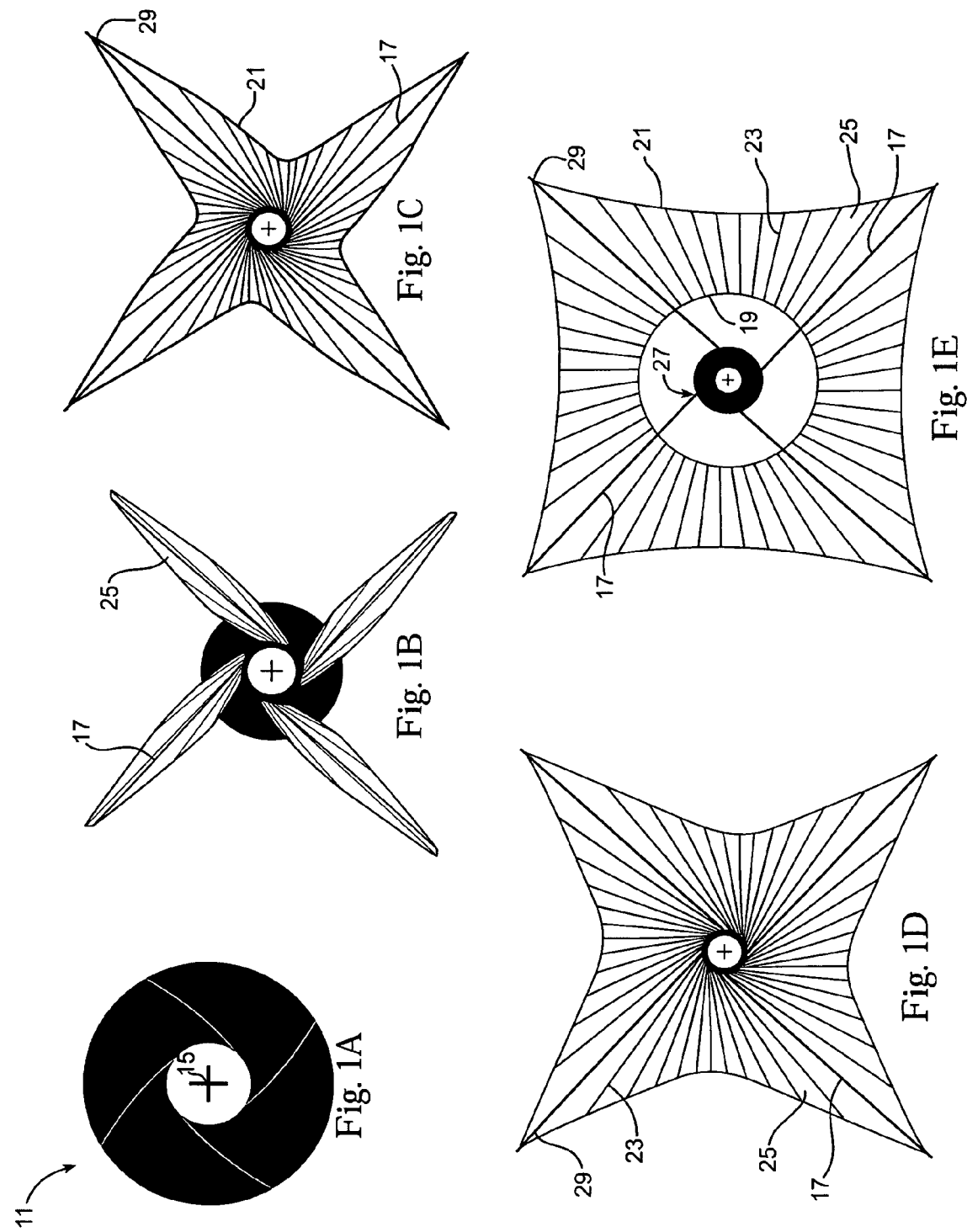
FIGS. 1A through 1E comprise a sequential series of schematic drawings showing the same top plan view of an embodiment present invention, wherein FIG. 1A initially shows the structure in its collapsed or stored configuration, followed by the interim stages of deployment shown in FIGS. 1B, 1C, and 1D, with full deployment being shown in FIG. 1E.
Figure 2:
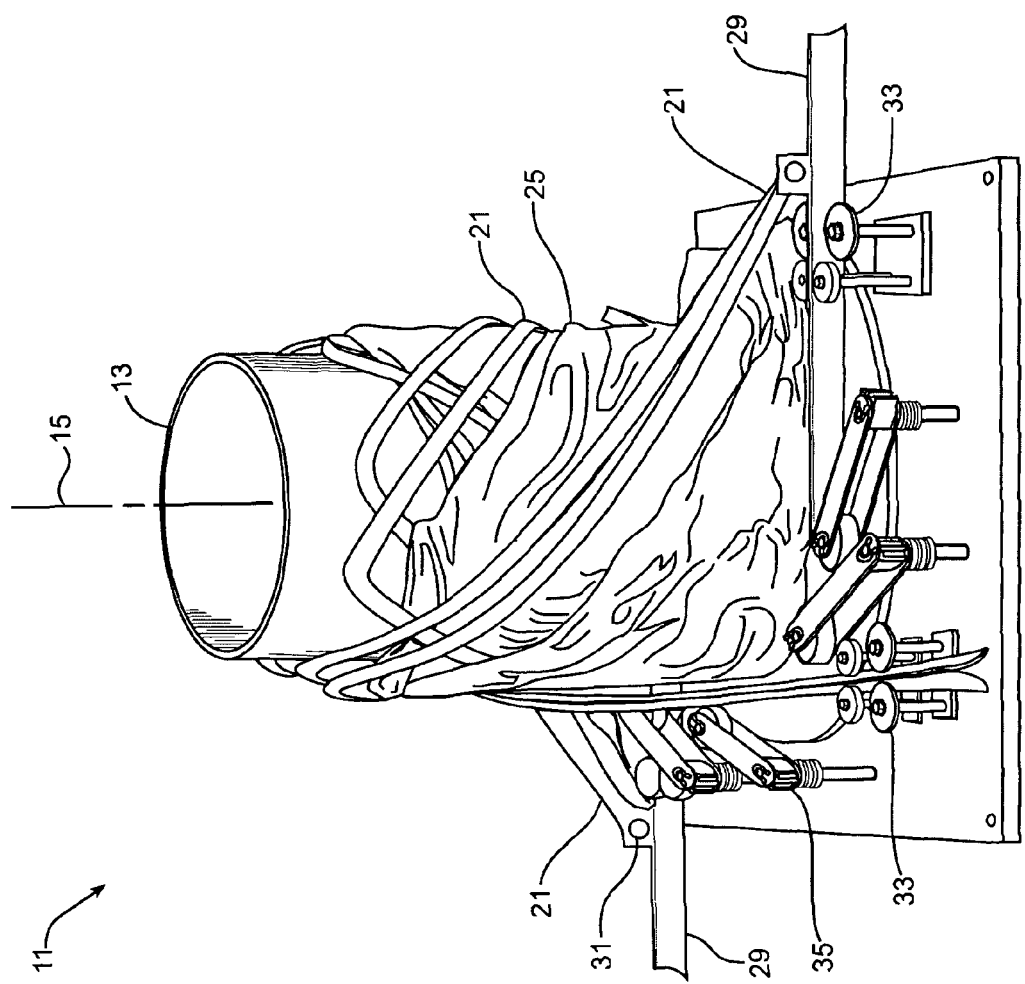
FIG. 2 shows a perspective view of an embodiment of the present invention in its collapsed configuration, corresponding to FIG. 1A.
Figure 4:
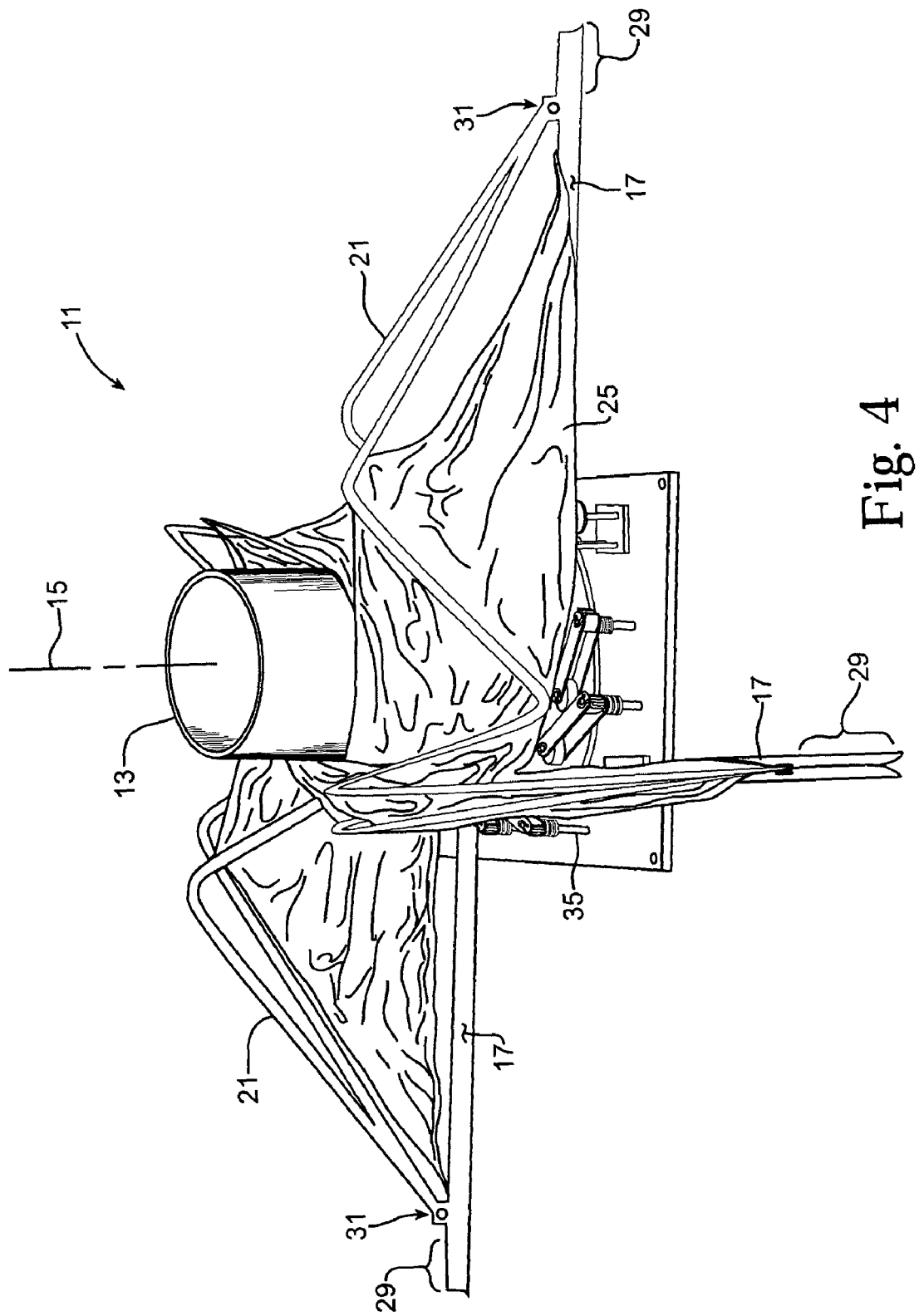
FIG. 4 shows a perspective view of the aforementioned embodiment of the present invention in the partial stage of deployment schematically shown in FIG. 1B.
Figure 6:
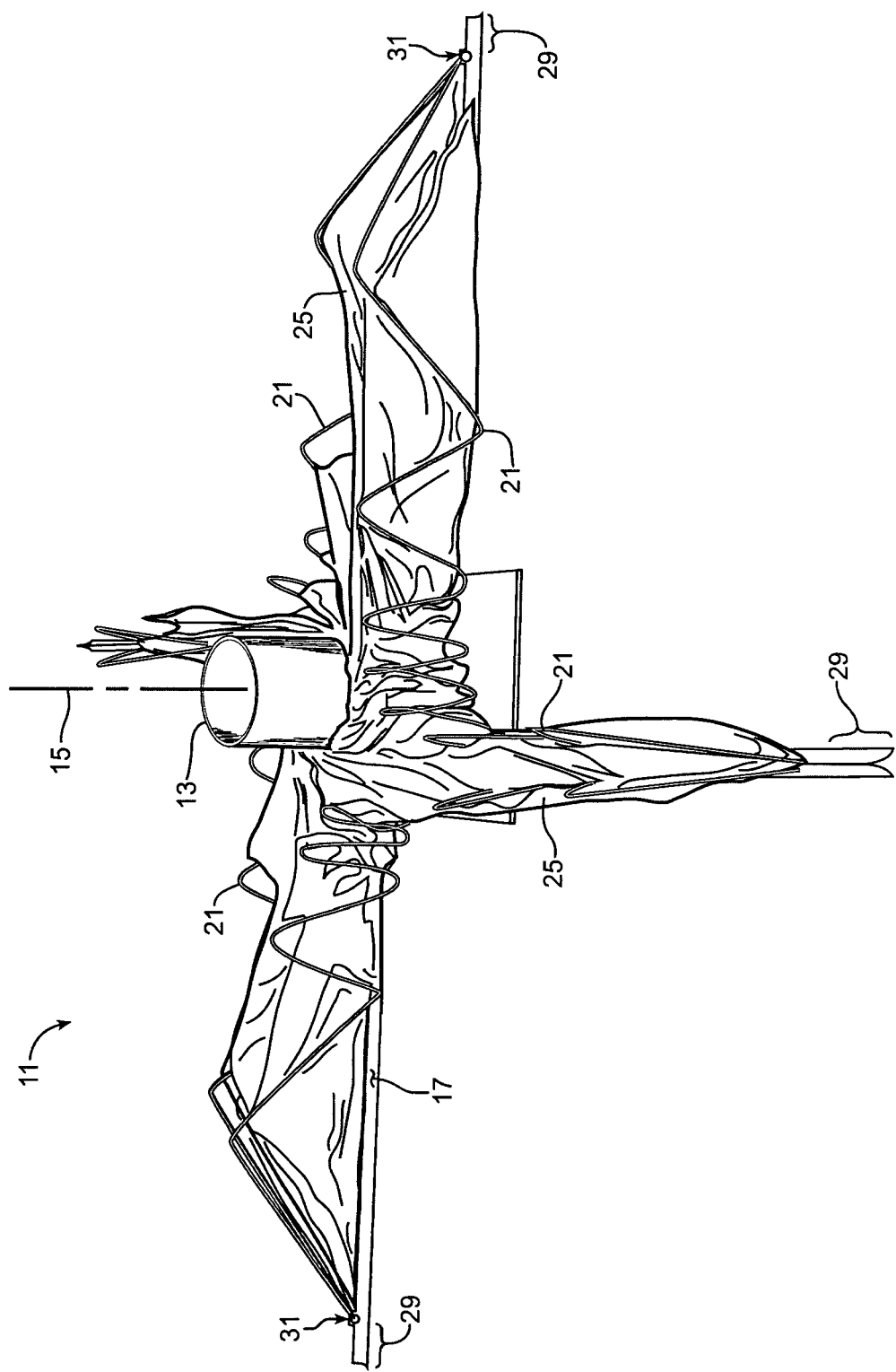
FIG. 6 shows a perspective view of the aforementioned embodiment of the present invention in the partial stage of deployment schematically shown in FIG. 1C.
Figure 7:
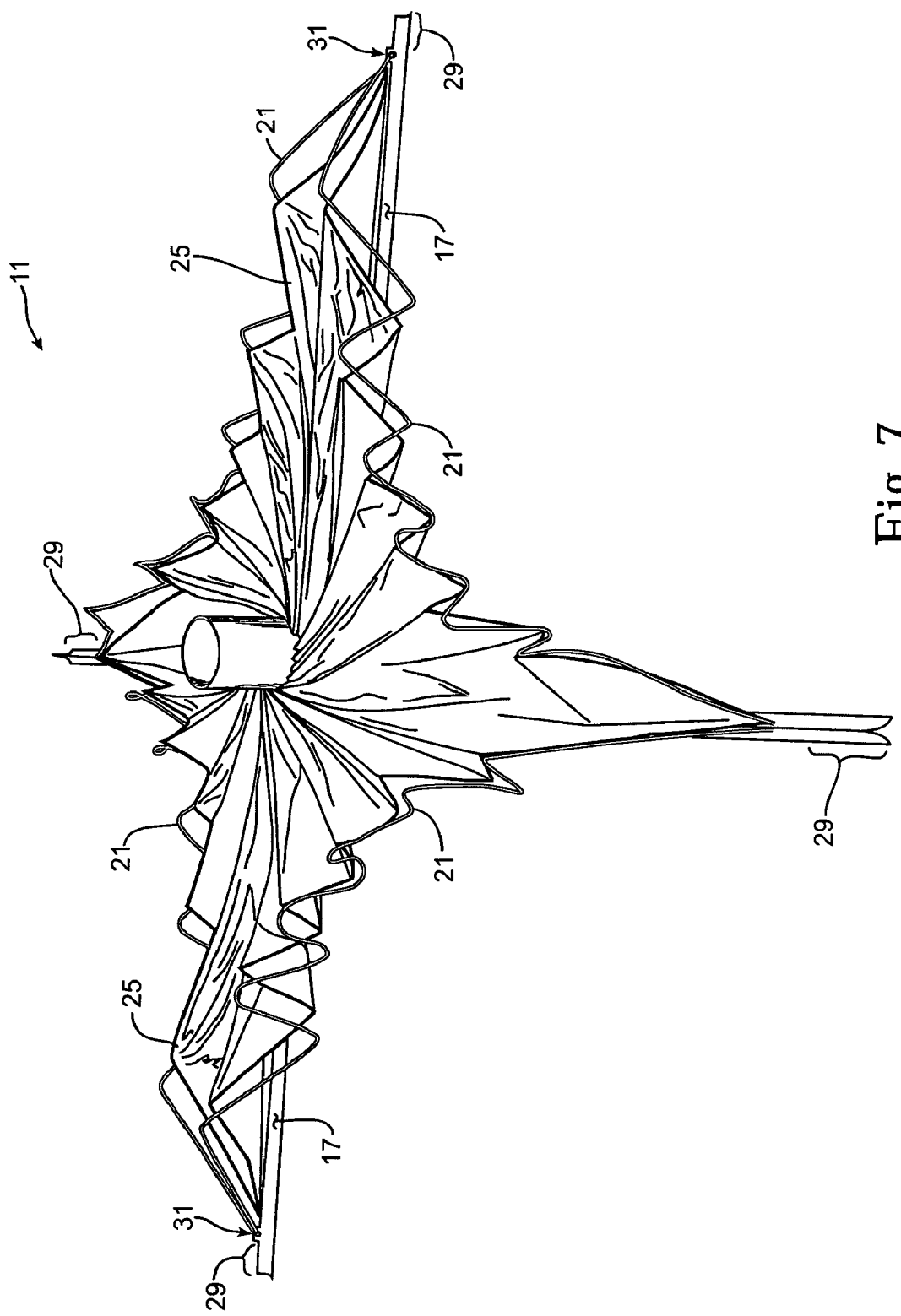
FIG. 7 shows a perspective view of the aforementioned embodiment of the present invention in the partial stage of deployment schematically shown in FIG. 1D.
Figure 8:
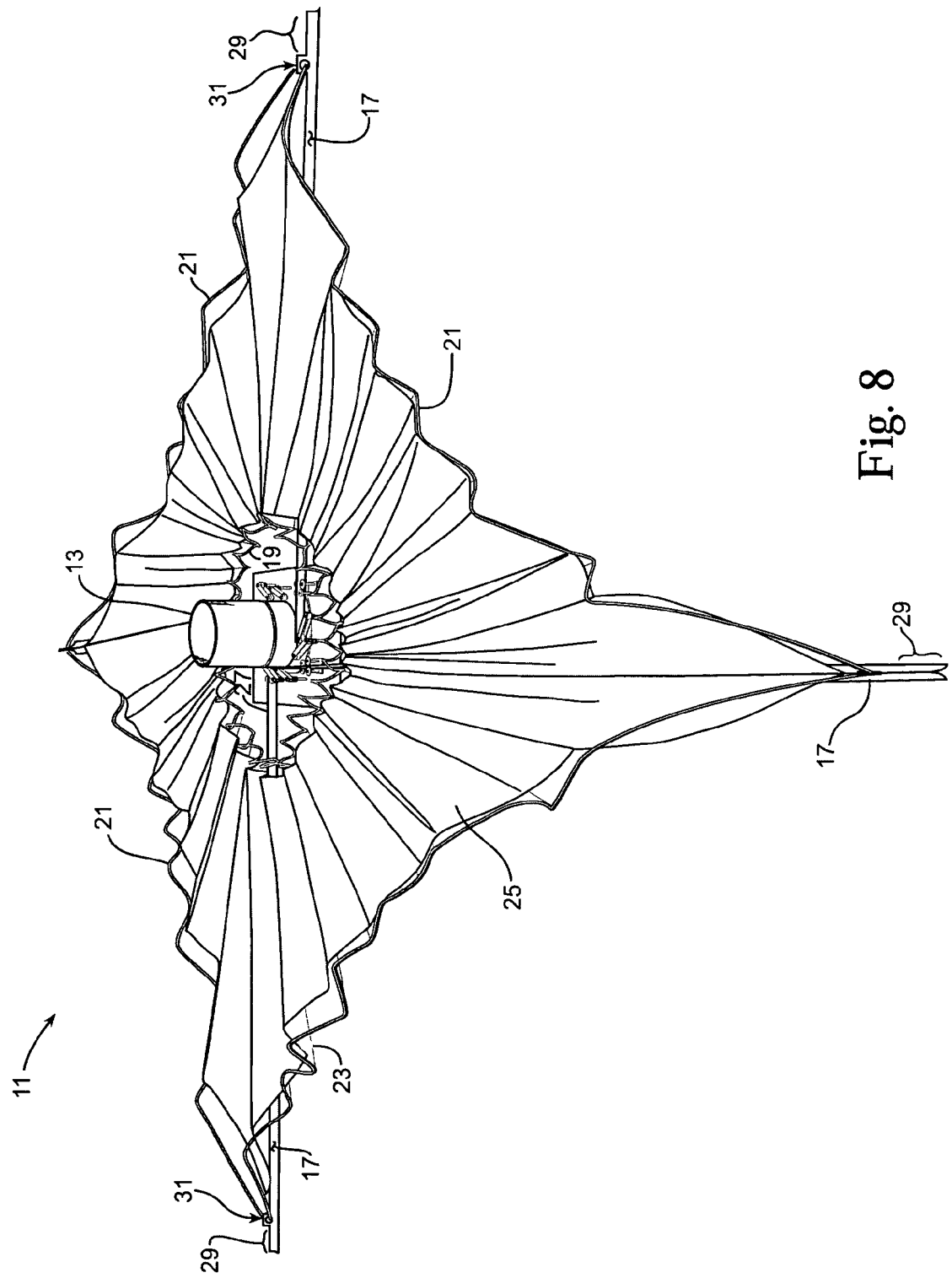
FIG. 8 shows a perspective view of the aforementioned embodiment of the present invention in its fully deployed configuration, as otherwise shown schematically in FIG. 1E.

Turning to the drawings, FIGS. 1A through 1E comprise a sequential series of schematic drawings showing the same top plan view of structure 11, an embodiment of the present invention, wherein FIG. 1A initially shows structure 11 in its collapsed or stored configuration, followed by the interim stages of deployment shown in FIGS. 1B, 1C, and 1D, until full deployment is finally realized in FIG. 1E. A perspective view of structure 11 in its collapsed configuration, corresponding to FIG. 1A, is shown in FIG. 2. A perspective view of structure 11 in the partial stage of deployment schematically shown in FIG. 1B is illustrated in FIG. 4. Similarly, FIG. 6 shows a perspective view of structure 11 in the partial stage of deployment schematically shown in FIG. 1C; FIG. 7 is perspective view of structure 11 corresponding to FIG. 1D; and FIG. 8 is a perspective view of structure 11 fully deployed, corresponding to FIG. 1E.

Structure 11 includes cylindrical drum 13 having axis of rotation 15 about which it may rotate. Axis of rotation 15 is collinear with the axis of revolution of drum 13. As most clearly shown the fully deployed configuration pictured in FIGS. 1E and 8, structure 11 is further comprised of masts 17, inner spar 19, outer spar 21, radial cords 23 and flexible material 25. Mast 17 is comprised of proximal segment 27 and distal end 29. Proximal segment 27 is attached to drum 13. Outer spar 21 circumscribes drum 13, and connects distal ends 29. Outer spar 21 is attached to distal ends 29 by joints 31.

Inner spar 19 also circumscribes drum 13, and lies closer to drum 13 that outer spar 21. Inner spar 19 connects masts 17 at locations lying in between proximal segments 27 and distal ends 29, respectively. Cords 23 extend radially with respect to axis of rotation 15, and connect inner spar 19 and outer spar 21. Flexible material 25 is attached to cords 23.

Mast 17 is resilient and flexible about an axis parallel to axis of rotation 15, and a bending stress is created in mast 17 when it is deformed from a linear configuration about the aforementioned axis. It is rigid about other axes. In the collapsed configuration shown in FIGS. 1A and 2, masts 17 are wrapped around drum 13. Thus, a bending stress arises in masts 17 when they are in the aforementioned collapsed configuration. A restraint (not shown) prevents the rotation of drum 13 by opposing the bending stress. The restraint may be any mechanism commonly used to prevent rotation of a cylindrical object.

Figure 3:
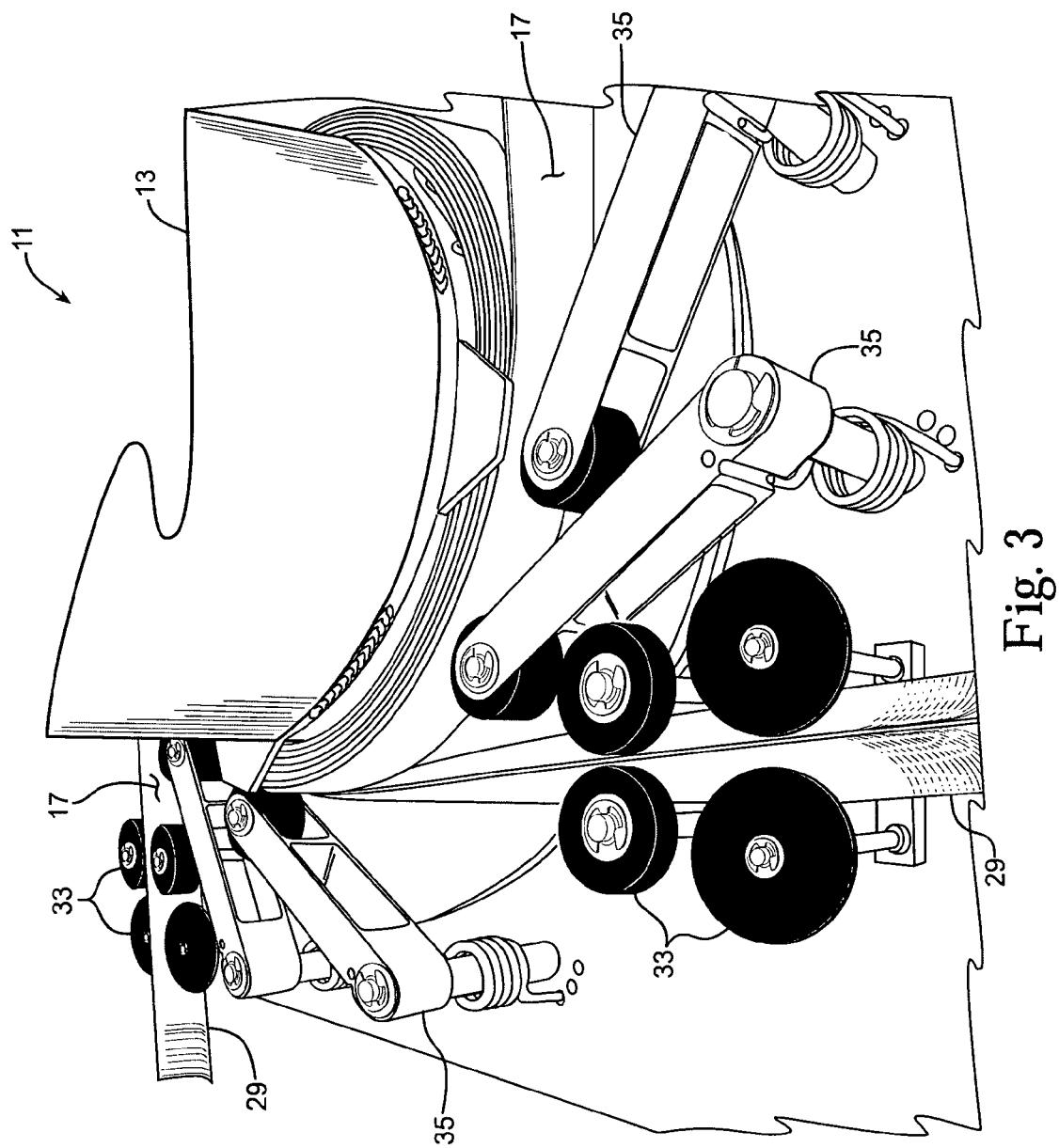
FIG. 3 is an enlarged partial view of structure shown in FIG. 2, particularly showing the rollers and arms used to restrain and guide the masts of the present invention. Elements of the structure have been deleted to facilitate understanding.

As particularly shown in FIG. 3, rollers 33 and arms 35 are in lateral and frictional contact with each mast 17. They perform several functions when the restraint acting on drum 13 is disengaged to allow drum 13 freedom of rotation. Firstly, they oppose the bending stress and transfer this strain energy to drum 13, causing it to rotate in a counterclockwise direction and thereby allow masts 17 to extend. The initial stage of extension and deployment is shown in FIGS. 1B and 4. Secondly, the frictional resistance of rollers 33 and arms 35 is adjustable to control the rate at which masts 17 extend. Furthermore, rollers 33 laterally constrain masts 17 to provide equal spacing between adjacent masts in the fully deployed configuration. Inner spar 19, outer spar 21 and cords 23 are in tension during this and subsequent stages of deployment.

Figure 5:
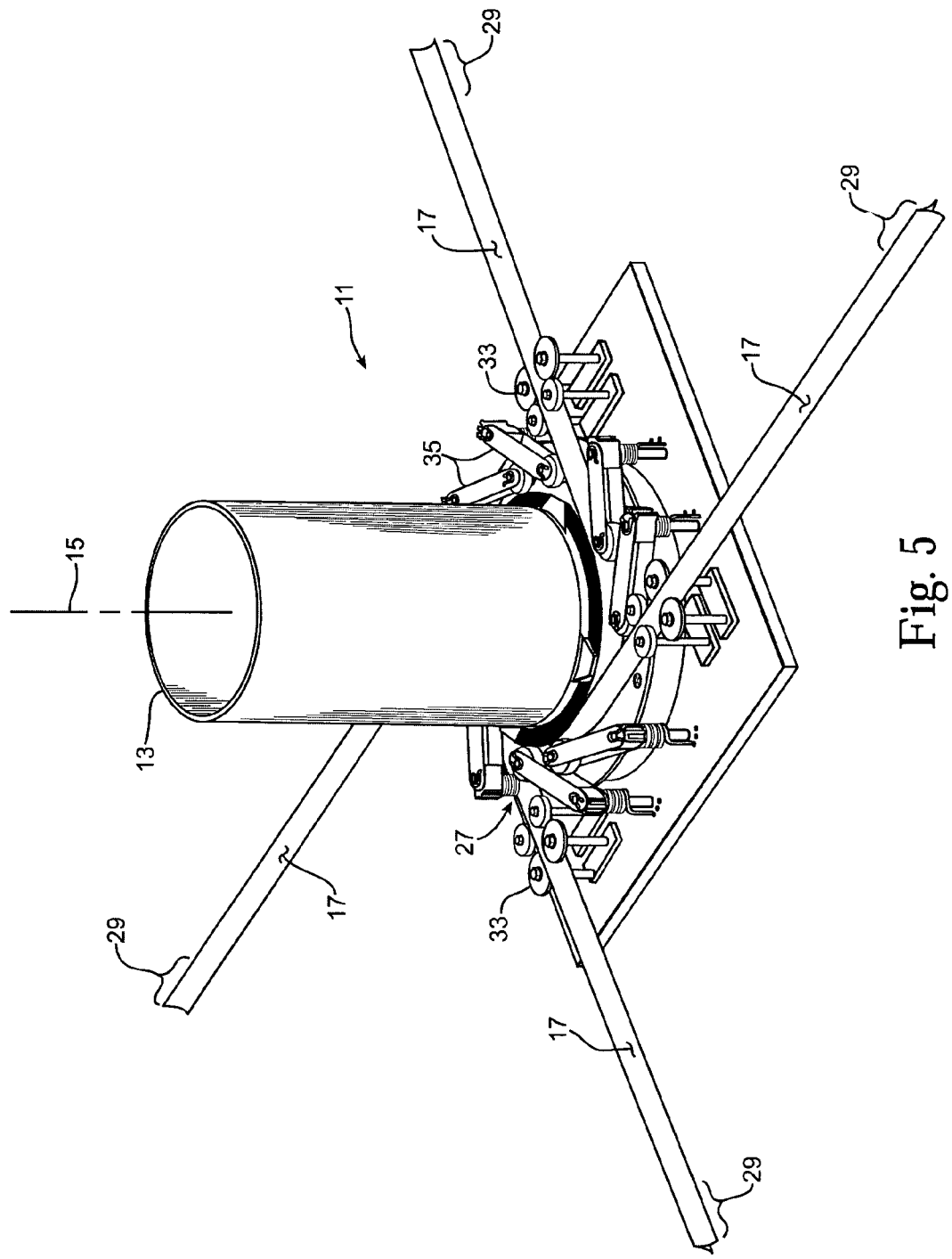
FIG. 5 again provides the perspective view of the aforementioned embodiment shown partially deployed in FIG. 4, but, in order to facilitate understanding, the flexible material, cords and spars have been deleted.

The relationship between masts 17, rollers 33, arms 35 and drum 13 is also illustrated in FIG. 5, which shows apparatus 11 in the same degree of partial deployment as FIG. 4, but with inner spar 19, outer spar 21, radial cords 23 and flexible material 25 deleted in order to facilitate understanding. FIG. 1C and corresponding FIG. 6 show further deployment and extension of masts 17. FIG. 1D and corresponding FIG. 7 illustrate the stage of deployment just before the complete deployment shown in FIGS. 1E and 6 is realized.

Inner spar 19, outer spar 21 and cords 23 remain in tension when the complete deployment of masts 17 and structure 11 is realized. The choice of material 25 depends upon the function of structure 11. For example, if structure 11 was to be stored on a spacecraft for subsequent deployment as a solar sail, material 25 would be a thin membrane for reflecting the impact of photons and thereby providing a propulsive force.

As is clear from the foregoing description, the present invention uses no hinges or springs to assist in deploying material 25. Only the strain energy stored in wrapping masts 17 around drum 13 is used to deploy the structure into the desired configuration. Thus, the present invention realizes the attendant benefits of enhanced reliability, improved mass efficiency, and minimizes the space required for storage.

It is to be understood that the preceding is merely a detailed description of an embodiment of this invention and that numerous changes to the disclosed embodiment may be made in accordance with the disclosure herein without departing from the spirit or scope of the invention. The preceding description, therefore, is not meant to limit the scope of the invention. Rather the scope of the invention is to be determined only by the appended claims and their equivalents.

The invention claimed is:

1. A deployable structure for storing and unfurling a flexible material, comprising:
    a drum having a cylindrical exterior surface, with the surface having an axis of revolution and the drum being rotatable about the axis of revolution;
    a plurality of flexible and resilient masts, with each of the masts having a proximal end attached to the drum suffice;
    the masts collectively having a collapsed configuration and a deployed configuration, with the masts being wrapped around the drum surface when in the collapsed configuration and completely unwrapped when in the deployed configuration;
    a bending stress arising in each mast when the masts are in a configuration other than the deployed configuration;

each of the masts lying on a tangent to, and extending linearly from, the drum surface when the masts are in the deployed configuration;

the masts being connected by a plurality of flexible and resilient spars, with the spars being in tension along the respective lengths of the spars;

the spars circumscribing the drum when the masts are in the deployed configuration; and a plurality of flexible cords for connecting the spars, with the cords extending radially with respect to the axis of revolution and being in tension.

2. A deployable structure as defined by claim 1 wherein the drum rotates in a deployment direction and at a rotation rate when the masts are being unwrapped from the drum and deployed from the collapsed configuration into the deployed configuration.

3. A deployable structure as defined by claim 2 further comprising:

means for opposing the bending stress and means for restraining rotation of the drum so that the masts are restrained from extending and kept in the collapsed configuration when the opposing means and the restraining means are engaged; and means for disengaging the opposing means and the restraining means so that the masts are able to extend into the deployed configuration.

4. A deployable structure as defined in claim 3 wherein the disengagement means is also for controlling the rotation rate by controllably disengaging the opposing means and the restraining means.

5. A deployable structure as defined by claim 4 wherein:

each of the masts has a distal end;

the spars are comprised of an inner spar and an outer spar;

the outer spar connects the distal ends; and the inner spar lies closer to the drum than the outer spar, and also connects the masts.

6. A deployable structure as defined by claim 5 further comprising means for guiding the masts when the masts are being unwrapped from the drum and deployed from the collapsed configuration into the deployed configuration, and also for spacing the distal ends at approximately equal intervals when the masts are in the deployed configuration.

7. A deployable structure as defined by claim 6 wherein the opposing means includes the guiding means.

8. A deployable structure as defined by claim 7 wherein:

the masts lie in a plane when in the deployed configuration;

the masts lie in the plane when in the collapsed configuration; and the plane lies normal to the axis of revolution.

9. A deployable structure as defined by claim 8 further comprising a flexible material attached to the cords.

10. A deployable structure as defined by claim 9 wherein each of the masts is flexible only about an axis lying in parallel with the axis of revolution.

11. An apparatus for storing and unfurling a flexible material comprising:

a mast being flexible, resilient, and linear in the absence of a bending stress, and having the bending stress arise when being forced into a nonlinear shape;

a stored configuration having a plurality of the masts being wrapped around a cylindrical drum in nonlinear shapes;

adjustable means for applying a variable opposing force against the mast;

the masts being unfurled when the opposing force is less than the bending stress;

the masts being in an unfurled configuration when each of the masts is in a linear shape;

each of the masts lying on a tangent, respectively, to a cylindrical surface of the drum and contacting the cylindrical surface along the tangent, and the masts lying in a plane when the masts are in the unfurled configuration;

the drum having an axis of revolution and the plane lying normal to the axis of revolution;

each of the masts including a proximal segment lying adjacent to the drum and a distal end lying further away from the drum than the proximal segment when the mast is in a linear shape;

an inner spar and an outer spar, with the spars being flexible, resilient and in tension along the respective lengths of the spars;

the spars circumscribing the drum when the masts are in the unfurled configuration; and the inner spar connecting the proximal segments and the outer spar connecting the distal ends.

12. An unfurling apparatus as defined by claim 11 wherein:

the drum is rotatable about the axis of revolution;

means for resisting rotation of the drum about the axis of revolution; and the resisting means being disengaged to allow rotation of the drum when the opposing force is less than the bending stress.

13. An unfurling apparatus as defined by claim 12 wherein:

the masts unfurl at a rate; and further comprising means for controlling the rate by controlling the opposing force.

14. An unfurling apparatus as defined by claim 13 further comprising cords being radially disposed with respect to the axis of revolution and being in tension.

15. An unfurling apparatus as defined by claim 14 further comprising means for guiding the masts as they are unfurling and for spacing the distal ends apart from one another so that spacing between adjacent distal ends is approximately equal when the masts are in the unfurled configuration.

16. An unfurling apparatus as defined by claim 15 wherein the opposing means includes the guiding means.

17. An unfurling apparatus as defined by claim 16 further comprising a flexible material being attached to the cords.

18. An unfurling apparatus as defined by claim 17 wherein the opposing means includes applying a frictional force against the masts.

19. An unfurling apparatus as defined by claim 18 wherein the plurality of masts is comprised of at least four masts.

* * * * *